(12) United States Patent
Chaieb et al.

(10) Patent No.: US 9,715,052 B2
(45) Date of Patent: Jul. 25, 2017

(54) METHODS AND DEVICES FOR COLLOIDAL SUSPENSION FILTERS

(71) Applicant: King Abdullah University of Science and Technology, Thuwal (SA)

(72) Inventors: Sahraoui Chaieb, Thuwal (SA); Jehad El Demellawi, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 15 days.

(21) Appl. No.: 14/697,898

(22) Filed: Apr. 28, 2015

(65) Prior Publication Data
US 2015/0309226 A1    Oct. 29, 2015

Related U.S. Application Data

(60) Provisional application No. 61/985,496, filed on Apr. 29, 2014.

(51) Int. Cl.
*G02B 5/24* (2006.01)
*G02B 5/22* (2006.01)
*H01S 3/00* (2006.01)

(52) U.S. Cl.
CPC ............. *G02B 5/24* (2013.01); *G02B 5/22* (2013.01); *H01S 3/0078* (2013.01)

(58) Field of Classification Search
CPC . G02B 5/24; G02B 5/22; G02B 5/223; G02B 5/206
USPC .................. 359/885, 886; 356/334
See application file for complete search history.

(56) References Cited

U.S. PATENT DOCUMENTS

| | | | |
|---|---|---|---|
| 5,131,736 A * | 7/1992 | Alvarez | G02B 5/24 356/334 |
| 5,452,123 A * | 9/1995 | Asher | B82Y 20/00 359/296 |
| 2013/0098432 A1* | 4/2013 | Lim | H01L 31/0549 136/255 |

* cited by examiner

*Primary Examiner* — Audrey Y Chang
(74) *Attorney, Agent, or Firm* — Thomas | Horstemeyer, LLP

(57) ABSTRACT

Embodiments of the present disclosure provide for a colloidal amorphous silicon liquid filter device, methods of using a colloidal amorphous silicon liquid filter device, and the like.

7 Claims, 4 Drawing Sheets

METHODS AND DEVICES FOR COLLOIDAL SUSPENSION FILTERS

CROSS-REFERENCE TO RELATED APPLICATION

This application claims the benefit of and priority to U.S. Provisional Patent Application No. 61/985,496 entitled "METHODS AND DEVICES FOR COLLOIDAL SUSPENSION FILTERS" filed on Apr. 29, 2014, which is expressly incorporated by reference as if fully set forth herein in its entirety.

BACKGROUND

In certain applications, it may be desirable to attenuate laser beam radiation at one or more laser wavelengths, while simultaneously transmitting a substantial portion of the incoming radiation at other wavelengths. One method of filtering lasers involves the use of optical laser filters that may incorporate one or more compounds, selected for their absorption characteristics, into a suitable solid light-transmissive host material. Another method of filtering lasers involves the use of solid filters. However, powerful lasers may burn through solid filters that cannot dissipate energy released by the lasers.

Accordingly, there is a need to address the aforementioned deficiencies and inadequacies.

SUMMARY

Methods and devices are provided herein for filters to control or attenuate laser beam radiation, as well as tunable laser systems. In various embodiments we produce dispersions of nanoclusters in a colloidal solution to serve as the filter media. These nanoclusters can be very bright and can emit in the red (620 nm). When oxidized in solutions these dispersions may shift by almost 100 nm and start emitting in the green. We studied the UV-Vis absorption spectra and found that when the emission is shifted towards the blue, the absorption can shift by more than 4 orders of magnitude (see FIG. 1). These colloidal dispersions can be used as liquid filters for strong lasers. In various aspects, the nanoclusters can be amorphous silicon nanoclusters in a colloidal solution.

Lasers that have output energy of more than 10 W can burn solid filters that cannot dissipate the energy released by the laser. In various embodiments we provide a liquid filter that can be used in the case of powerful lasers. A container, for example a rotating cylinder, can be filled with a solution, such as that described above, and the solution can be circulated to dissipate the heat. When the filter is to be tuned, we can inject another solution that corresponds to another absorption to obtain a different absorption.

In an embodiment, a liquid filter system is provided comprising: a housing; a first plurality of silicon nanoclusters in a colloidal suspension, wherein the first plurality of silicon nanoclusters in the colloidal suspension are disposed in the housing, wherein the first plurality of silicon nanoclusters in the colloidal suspension can have a first oxygen level, and wherein the first plurality of silicon nanoclusters in the colloidal suspension can absorb energy at a first wavelength and transmit energy at a second wavelength; and wherein the housing comprises an inlet and an outlet, the housing permitting a passage of a laser beam generated by a laser generator, wherein the plurality of silicon nanoclusters in the colloidal suspension can be configured to filter the laser beam, and wherein the housing can circulate the colloidal suspension to dissipate heat released from the laser beam.

In an embodiment, a method for controlling a wavelength of a laser beam is provided comprising: providing a transmissive housing comprising a first plurality of amorphous silicon nanoclusters in a colloidal suspension, the first plurality of amorphous silicon nanoclusters having a first level of oxygen, the first plurality of amorphous silicon nanoclusters absorbing at a first wavelength and emitting at a second wavelength; providing a second plurality of amorphous silicon nanoclusters into the colloidal suspension to adjust the absorption at the first wavelength and the emission at the second wavelength, the second plurality of amorphous silicon nanoclusters having a second level of oxygen, wherein the first level of oxygen and the second level of oxygen are different; and circulating the first plurality of amorphous silicon nanoclusters and the second plurality of amorphous silicon nanoclusters through the transmissive housing to dissipate heat.

In an embodiment, a tunable laser system is provided comprising: a laser generator configured to output a laser beam; and a transmissive housing; a first plurality of amorphous silicon nanoclusters in a colloidal suspension contained within the transmissive housing, wherein the plurality of amorphous silicon nanoclusters have a first level of oxygen, wherein the plurality of amorphous silicon nanoclusters in the colloidal suspension are configured to filter the laser beam, and wherein the transmissive housing dissipates heat.

In any one or more aspects of the tunable laser system the first plurality of amorphous silicon nanoclusters in the colloidal suspension can absorb energy at a first wavelength and facilitate the transmission of energy at a second wavelength. The first wavelength and the second wavelength can be adjusted by adding a second plurality of amorphous silicon nanoclusters to the colloidal suspension through an inlet of the transmissive housing, wherein the second plurality of amorphous silicon nanoclusters have a second level of oxygen, wherein the first level of oxygen and the second level of oxygen are different.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Further aspects of the present disclosure will be more readily appreciated upon review of the detailed description of its various embodiments, described below, when taken in conjunction with the accompanying drawings.

DETAILED DESCRIPTION

Figure 1:
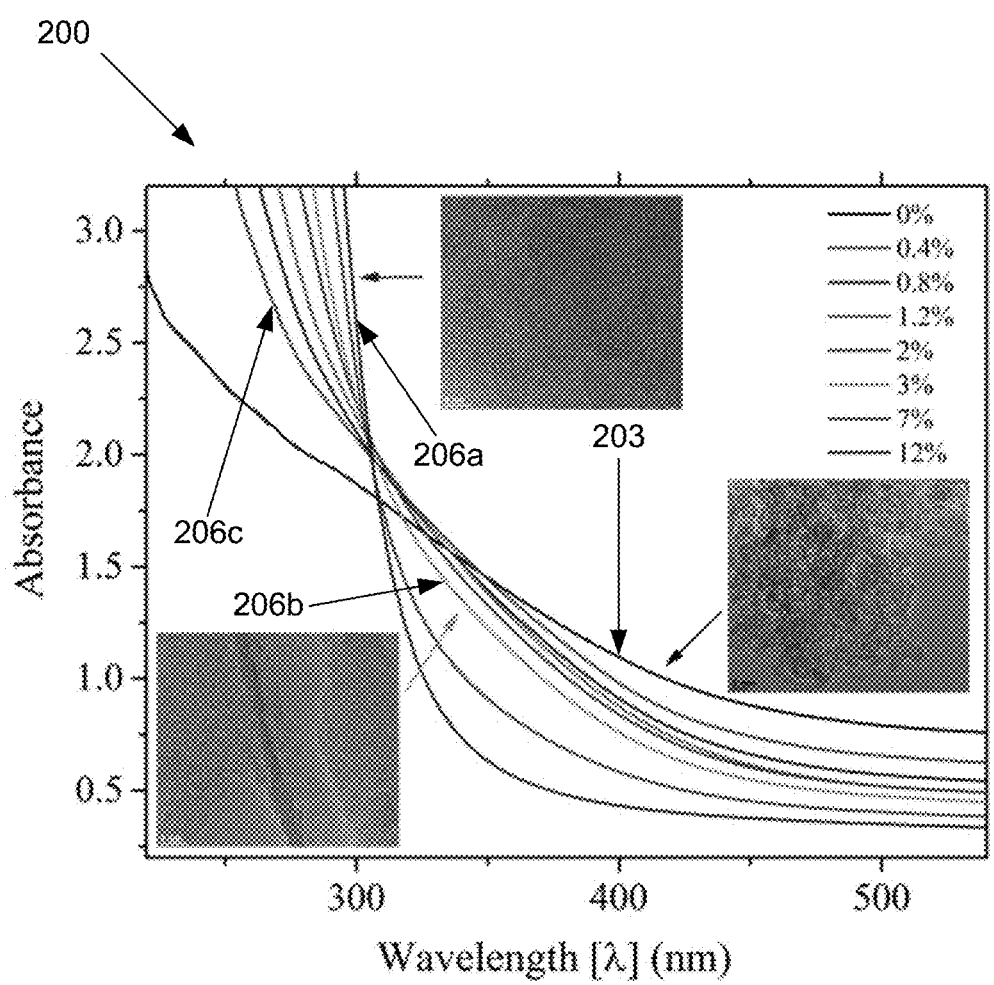
FIG. 1 is a graph with photos illustrating an absorption spectrum of a plurality of amorphous silicon particles in a colloidal suspension.

Described below are various embodiments of the present systems and methods for filters to control or attenuate laser beam radiation. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Discussion

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of material science, chemistry, physics, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric pressure. Standard temperature and pressure are defined as 20° C. and 1 atmosphere.

It is to be understood that, unless otherwise indicated, the present disclosure is not limited to particular materials, reagents, reaction materials, manufacturing processes, dimensions, frequency ranges, applications, or the like, as such may vary. It is also to be understood that the terminology used herein is for purposes of describing particular embodiments only, and is not intended to be limiting. It is also possible in the present disclosure that steps may be executed in different sequence, where this is logically possible. It is also possible that the embodiments of the present disclosure may be applied to additional embodiments involving measurements beyond the examples described herein, which are not intended to be limiting. It is furthermore possible that the embodiments of the present disclosure may be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Each of the applications and patents cited in this text, as well as each document or reference cited in each of the applications and patents (including during the prosecution of each issued patent; "application cited documents"), and each of the PCT and foreign applications or patents corresponding to and/or claiming priority from any of these applications and patents, and each of the documents cited or referenced in each of the application cited documents, are hereby expressly incorporated herein by reference in their entireties. Further, documents or references cited in this text, in a Reference List before the claims, or in the text itself; and each of these documents or references ("herein cited references"), as well as each document or reference cited in each of the herein-cited references (including any manufacturer's specifications, instructions, etc.) are hereby expressly incorporated herein by reference.

Description

Embodiments of the present disclosure provide for a colloidal amorphous silicon liquid filter device, methods of using the colloidal amorphous silicon liquid filter device, and the like. As a non-limiting example, a plurality of colloidal amorphous silicon nanoclusters in a colloidal suspension may be enclosed within a transmissive housing, wherein the plurality of amorphous silicon nanoclusters in the colloidal suspension may be configured to filter a laser beam released from a laser generator, and wherein the transmissive housing may be configured to dissipate heat released from the laser beam passing through the transmissive housing. The plurality of amorphous silicon nanoclusters in the colloidal suspension may have a first level of oxygen, wherein the first level of oxygen is associated with an absorption wavelength and an emission wavelength. The absorption wavelength and the emission wavelength may be adjusted by adding a solution having a second oxygen level to the colloidal suspension. The solution may comprise another plurality of amorphous silicon nanoclusters having the second oxygen level. The colloidal suspension may be circulated through the transmissive housing to further dissipate heat released from the laser beam passing through the transmissive housing.

A colloidal suspension may comprise a plurality of amorphous silicon particles. The plurality of amorphous silicon particles in the colloidal suspension may range in size between hundreds of nanometers to several microns. Individual ones of the plurality of amorphous silicon particles may be composed of highly porous irregularly shaped structures. Non-limiting examples of the plurality of amorphous silicon particles are described in U.S. Application No. 61/638,574, titled "COLLOIDAL PHOTOLUMINESCENT AMOURPOUS POROUS SILICON, METHODS OF MAKING COLLOIDAL PHOTOLUMINESCENT AMOURPOUS POROUS SILICON, AND METHODS OF USING COLLOIDAL PHOTOLUMINESCENT AMOURPOUS POROUS SILICON," and filed on Apr. 26, 2012, which is incorporated by reference herein in its entirety. In general, a method of making the plurality of amorphous silicon particles in a colloidal suspension may involve using ultrasonic energy. The plurality of amorphous silicon particles and/or the colloidal suspension may facilitate the transmission of energy at a specific wavelength and absorb energy at a specific wavelength. In some embodiments, the plurality of amorphous silicon particles and/or the colloidal suspension may transfer energy at a specific wavelength and absorb energy at a specific wavelength.

According to some embodiments, the plurality of amorphous silicon particles may be formed as nanoclusters in the colloidal suspension. The plurality of amorphous silicon particles may have a first level of oxygen. The plurality of amorphous silicon particles may absorb energy at an absorption wavelength and may facilitate the transmission of energy at an emission wavelength. For example, the plurality of amorphous silicon particles in the colloidal suspension may be relatively bright and transmit and/or emit energy at an emission wavelength of about 650 nm. In some embodiments, the plurality of amorphous silicon particles may be oxidized, as further described below. In such embodiments, the emission wavelength of the plurality of amorphous silicon particles that have been oxidized may decrease by about 100 nm. In other words, the plurality of amorphous silicon particles in the colloidal suspension that have been oxidized may have an emission wavelength of about 520 nm to 635 nm. Therefore, the plurality of amorphous silicon particles in the colloidal suspension that have been oxidized may absorb more energy from a light source than the plurality of amorphous silicon particles in the colloidal suspension that have not been oxidized.

With reference to FIG. 1, shown is a graph 200 with photos illustrating an absorption spectrum of the plurality of amorphous silicon particles in the colloidal suspension. The absorption spectrum shown in graph 200 may represent a spectrum formed by heat, energy, light, and/or radiation that has transmitted through the colloidal suspension. In this regard, graph 200 shows multiples lines, including lines 203 and 206a-c, the lines illustrating absorption over a range of wavelengths. Line 203 represents an absorption spectrum of the plurality of amorphous silicon particles in the colloidal suspension that have not been treated with an oxidizing agent. In contrast, lines 206a, 206b, and 206c represent absorption spectrums of the respective plurality of amorphous silicon particles in the colloidal suspension that has been treated with an oxidizing agent. The difference between line 203 and lines 206a-c illustrates that oxidizing the colloidal suspension may result in the plurality of amorphous silicon particles within the colloidal suspension having the ability to absorb higher amounts of heat, energy, and/or radiation.

An absorption coefficient (a) for the colloidal suspension may be obtained by measuring light wavelengths as it passes through the colloidal suspension disposed between two transparent surfaces. The absorption coefficient of the colloidal suspension may be based on the oxygen level in the colloidal suspension. The absorption rate for the colloidal suspension comprising the plurality of amorphous silicon particles may measure how well the colloidal suspension absorbs heat, energy, and/or radiation from a light source. In other words, the absorbance rate for the colloidal suspension may be determined based on the absorption coefficient of the colloidal suspension.

Lines 206a-c represent the respective absorption spectra of various embodiments of a first plurality of amorphous silicon particles in a colloidal suspension after injecting a second plurality of amorphous silicon nanoclusters and/or any oxidizing solution containing hydrogen peroxide to the colloidal suspension. As discussed above, the second plurality of amorphous silicon nanoclusters and/or oxidizing solution has a second oxygen level that may result in increasing the total oxygen level of the colloidal suspension upon adding the second plurality of amorphous silicon nanoclusters and/or oxidizing solution to the colloidal suspension. As shown in FIG. 1, the absorption rate of the first and second plurality of amorphous silicon nanoclusters in the colloidal suspension may increase by more than four orders of magnitudes based on the total oxygen level in the first and second plurality of amorphous silicon nanoclusters in the colloidal suspension. As such, the resulting total plurality of amorphous silicon nanoclusters in the colloidal suspension may absorb energy of higher wavelengths.

The colloidal suspension represented by line 203 has a relatively lower absorption rate than the respective colloidal suspensions represented by lines 206a-c. For example, the colloidal suspension represented by line 203 has an absorption coefficient of less than $2.0\alpha$ for a wavelength of 300 nm. In contrast, lines 206a-c have much higher absorption coefficients for the same wavelength of 300 nm. Therefore, the colloidal suspension represented by line 203 has an absorbance rate that is several orders of magnitude lower than the absorption rates of the respective colloidal suspensions represented by lines 206a-c.

The addition of any solution having a different oxygen level may result in the plurality of amorphous silicon particles in the colloidal suspension having the ability to absorb energy having higher wavelengths. In some embodiments, the addition of another plurality of amorphous silicon particles, in the form of nanoclusters, containing a different oxygen level may result in a total plurality of amorphous silicon nanoclusters in the colloidal suspension having the ability to absorb energy at higher wavelengths. For example, when the plurality of amorphous silicon nanoclusters emit energy and/or heat at about 435 nm to 500 nm, the absorption coefficient (a) of the total plurality of amorphous silicon nanoclusters in the colloidal suspension may shift by more than four orders of magnitude after oxidization.

According to some embodiments, the plurality of amorphous silicon particles in the colloidal suspension may initially have a first oxygen level. In such embodiments, the plurality of amorphous silicon particles in the colloidal suspension may absorb energy at a first wavelength and facilitate the transmission of energy at a second wavelength. The absorption at the first wavelength and/or the transmission at the second wavelength may be based on the first oxygen level in the plurality of amorphous silicon particles in the colloidal suspension. The absorption at the first wavelength and/or the transmission at the second wavelength may be adjusted by adding a solution having a second oxygen level to the colloidal suspension. In an embodiment, the absorption at the first wavelength and/or the transmission at the second wavelength may be adjusted by adding a second plurality of amorphous silicon nanoclusters to the colloidal suspension, wherein the second plurality of amorphous silicon nanoclusters may have a second oxygen level, and wherein the first oxygen level and the second oxygen level may be different. In another embodiment, the first oxygen level and the second oxygen level may be the same. The absorption coefficient and the absorption rate of the colloidal suspension may be determined based on a total oxygen level in the colloidal suspension.

The first oxygen level may be a measure of an initial proportion of oxygen in the colloidal suspension. For example, the first oxygen level may be a measure of the oxygen in the plurality of amorphous silicon particles in the colloidal suspension before being treated by an oxidizing solution comprising an oxidizing agent. The second oxygen level may measure a proportion of oxygen in the oxidizing solution that is being added to the colloidal suspension. The total oxygen level may be a measure of the oxygen level in the colloidal suspension after being treated by the oxidizing solution.

The oxidizing solution may be any solution comprising an oxidizing agent. For example, the oxidizing solution may be the oxidizing agent by itself. Alternatively and as described above, the oxidizing solution may comprise a second plurality of amorphous silicon nanoclusters mixed with an oxidizing agent. The oxidizing agent may be, but is not limited to, oxygen, ozone, hydrogen peroxide, other inorganic peroxides, fluorine, chlorine, other halogens, nitric acid, nitrate compounds, sulfuric acid, peroxydisulfuric acid, peroxymonosulfuric acid, chlorite, chlorate, perchlorate, hypochlorite, household bleach, hexavalent chromium compounds, permanganate compounds, sodium perborate, nitrous oxide, silver oxide, osmium tetroxide, potassium nitrate, and/or any other compound or solution capable of oxygenating the colloidal suspension.

The first, second, and total oxygen levels may be determined manually by, for example, calculating the oxygen by weight ratio of the colloidal suspension. The first, second, and total oxygen level may also be determined electronically using a device such as an oxygen sensor, an oxygen probe, and/or any device that can accurately calculate the oxygen level in a liquid.

In some embodiments, after adding the second plurality of amorphous silicon nanoclusters to the colloidal suspension, the total plurality of amorphous silicon nanoclusters in the colloidal solution may absorb energy at a different first wavelength and transmit energy at a different second wavelength. For example, after adding the second plurality of amorphous silicon nanoclusters to the colloidal suspension, the total plurality of amorphous silicon nanoclusters in the colloidal suspension may absorb energy at higher wavelengths than before.

In some embodiments, the amorphous silicon particles in the colloidal suspension may be used as liquid filters for relatively high energy lasers. Lasers that have an output energy of more than 10 watts may burn solid filters that cannot dissipate the energy released by the laser. However, embodiments of the present disclosure may operate as a liquid filter that may be used for a powerful laser that would otherwise burn through a solid filter.

Figure 2:
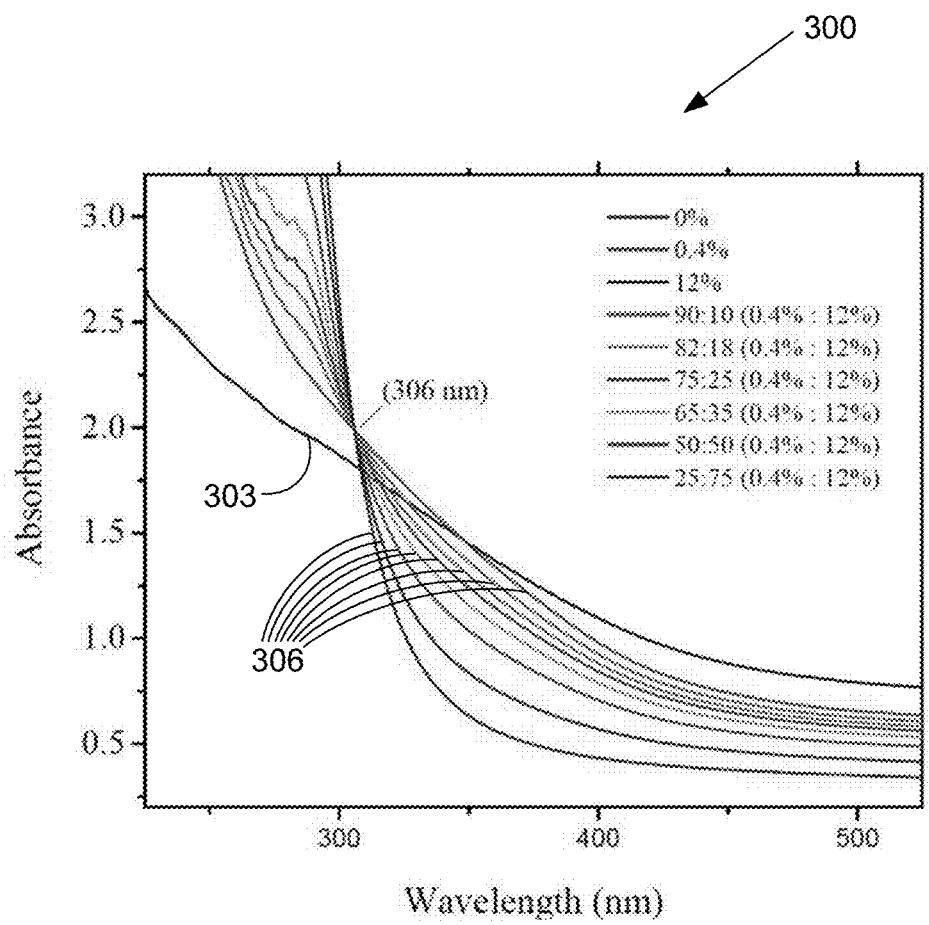
FIG. 2 is another graph illustrating an absorption spectrum of the plurality of amorphous silicon particles in the colloidal suspension.

FIG. 2 is another graph 300 illustrating an absorption spectrum of the plurality of amorphous silicon particles in the colloidal suspension. Graph 300 includes line 303 and lines 306. Line 303 represents an absorption spectrum of the plurality of amorphous silicon particles in the colloidal suspension that has not been oxidized. In contrast, lines 306 represent respective absorption spectrums of the plurality of amorphous silicon particles in the colloidal suspension that has been oxidized. The difference between line 303 and lines 306 illustrate that oxidizing the colloidal suspension may result in the plurality of amorphous silicon particles within the colloidal suspension having a higher absorbance of heat, energy, and/or radiation.

More specifically, graph 300 illustrates the absorption spectrum of the plurality of amorphous silicon particles in the colloidal suspension may include a percentage of hydrogen peroxide. Graph 300 shows the absorption coefficient versus the wavelength of the light hitting the plurality of amorphous silicon particles in the colloidal suspension. Line 303, which has a relatively low absorption coefficient, may represent the absorption spectrum for a first plurality of amorphous silicon nanoclusters in the colloidal suspension when no hydrogen peroxide has been added to the colloidal suspension. The remaining lines 306 in graph 300 show the substantial change in absorption rate of energy of the plurality of amorphous silicon particles in the colloidal suspension after adding the oxidizing solution containing varying amounts of hydrogen peroxide. That is to say, in some embodiments, when hydrogen peroxide is added to the colloidal suspension, the absorption rate of energy of the total plurality of amorphous silicon particles in the colloidal suspension may shift by more than three orders of magnitude.

For example, lines 306 represent the respective absorption spectra of various embodiments of a plurality of amorphous silicon particles in a colloidal suspension; each line 306 may represent the absorption spectrum for the colloidal suspension having a certain percentage of hydrogen peroxide. As described above, the hydrogen peroxide may have been added to the colloidal suspension by adding another solution containing the hydrogen peroxide into the colloidal suspension. The hydrogen peroxide itself may have been directly injected or added to the colloidal suspension thereby oxygenating the colloidal suspension. In some embodiments, the colloidal suspension represented by lines 306 may have a much higher absorbance of energy than the colloidal suspension represented by line 303. In some embodiments, more hydrogen peroxide added to the respective colloidal suspension resulted in a higher absorption rate of energy of the colloidal suspension.

In graph 300, lines 306 represent the absorption spectrums of respective colloidal suspension, each having varied percentages of hydrogen peroxide. The varied percentages of hydrogen peroxide represent a proportional amount of hydrogen peroxide in the colloidal suspension that may result in increasing the absorption rate of energy of the colloidal suspension. An operator of a colloidal suspension laser filter, further described below with regard to FIG. 3, may use graph 300 to consider what kind of mixture of the colloidal suspension, hydrogen peroxide, another plurality of amorphous silicon particles, and/or any other oxidizing agent, could be used to achieve a desired absorption rate of energy. Graph 300 illustrates that the resulting colloidal suspension after the addition of hydrogen peroxide may be used as a material to filter UV light for, for example, a relatively high powered laser. In some embodiments, once the colloidal suspension has been oxygenated to achieve the desired absorption, the colloidal suspension may be cooled so that a laser beam emitted from a laser beam generator may not damage the colloidal suspension, or a housing unit of the colloidal suspension.

Figure 3:
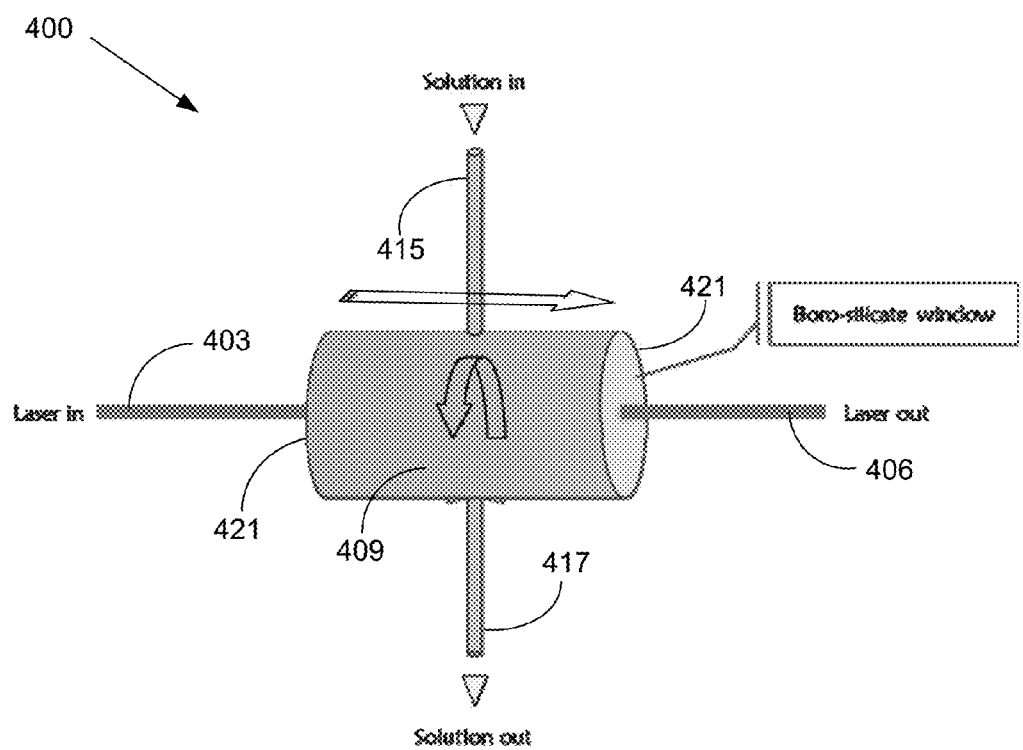
FIG. 3 illustrates an embodiment of a colloidal suspension laser filter using the plurality of amorphous silicon particles in the colloidal suspension.

FIG. 3 illustrates an embodiment of a colloidal suspension laser filter 400 using the plurality of amorphous silicon particles in the colloidal suspension. The embodiment can be a tunable laser system. The colloidal suspension laser filter 400 may comprise a laser beam input 403, a laser beam output 406, a transmissive housing 409, an inlet 415, an outlet 417, windows 421, and/or other components. The colloidal suspension laser filter 400 may operate as a tunable laser filter that allows transmission of a selectable wavelength of a light while excluding other wavelengths of the light. As may be appreciated, the transmissive housing 409 may be constructed of any transparent material that allows for the passage of a laser beam. In one embodiment, the transmissive housing 409 houses the plurality of amorphous silicon particles in the colloidal suspension, wherein the plurality amorphous silicon particles have a first oxygen level. The plurality of amorphous silicon particles in the colloidal suspension absorb heat and/or energy at a first wavelength and facilitate transmission of heat and/or energy at a second wavelength. In some embodiments, the absorption at the first wavelength and the facilitation at the second wavelength may be based on a total oxygen level of the plurality of amorphous silicon particles in the colloidal suspension, as described above.

According to some embodiments, the laser beam input 403 and the laser beam output 406 may be generated by a laser beam generator. The laser beam input 403 may enter the transmissive housing 409 at one or more input wavelengths through a first window 421. The laser beam output 406 may exit the transmissive housing 409 at one or more output wavelengths through a second window 421. The first window 421 and the second window 421, which may be at least the portions of the transmissive housing 409 through which the laser beam input 403 and the laser beam output 406 travel, may be made of boro-silicate windows. The plurality of amorphous silicon particles in the colloidal suspension within the transmissive housing 409 may function as a liquid filter that absorbs at least a portion of the heat, energy, and/or radiation from the laser beam input 403.

In some embodiments, the absorption occurring within the transmissive housing 409 dissipates heat, energy, and/or radiation from the laser beam input 403 such that the laser beam output 406 is less powerful than laser beam input 403. As the transmissive housing 409 dissipates heat, energy, and/or radiation from the laser beam input 403, the transmissive housing 409 may be configured to maintain the environment, such as the temperature, within the transmissive housing 409 so that the laser beam input 403 is emitted at a desired emission wavelength. For example, an operator of the colloidal suspension laser filter 400 may maintain the environment within the transmissive housing 409 by removing at least a portion of the colloidal suspension out of the transmissive housing 409 through the outlet 417 and adding another solution to the transmissive housing 409 through the inlet 415. The other solution may be an oxidizing solution or another plurality of amorphous silicon particles in another colloidal suspension that may mix with the colloidal suspension while having the same laser filtering capabilities. The other solution may be chilled or cooled to prevent the transmissive housing 409 from overheating.

As will be appreciated, the colloidal suspension laser filter 400 may be operated by a human or a machine. The operator of the colloidal suspension laser filter 400 may adjust the output wavelength of the laser beam output 406 by adding a second plurality of amorphous silicon nanoclusters with a second oxygen level, as discussed above. For example, the operator may add the second plurality of amorphous silicon nanoclusters through the inlet 415.

In one embodiment, the operator may manually adjust the total oxygen level in the plurality of amorphous silicon particles in the colloidal suspension within the transmissive housing 409. For example, the user may remove or circulate a portion of the colloidal suspension through the outlet 417. The user may circulate the colloidal suspension and may control the total oxygen level in the plurality of amorphous silicon particles, thereby also controlling the absorption wavelength and/or emission wavelength of the plurality of amorphous silicon particles. The user may manually circulate the colloidal suspension through the outlet 417 to further dissipate heat, energy, and/or radiation flowing through the transmissive housing 409 from the laser beam input 403. Alternatively, the colloidal suspension laser filter 400 may operate to circulate the colloidal suspension automatically through the transmissive housing 409 to dissipate the heat, energy, and/or radiation from the input laser beam 403.

In one embodiment, the user may rotate and/or tilt the colloidal suspension at various angles in the transmissive housing 409 to achieve the desired absorption wavelength and/or emission wavelength of the plurality of amorphous silicon particles. Alternatively, the transmissive housing 409 may be pre-configured to automatically rotate and/or tilt to achieve the desired absorption wavelength of the plurality of amorphous silicon particles in the colloidal suspension.

Figure 4:
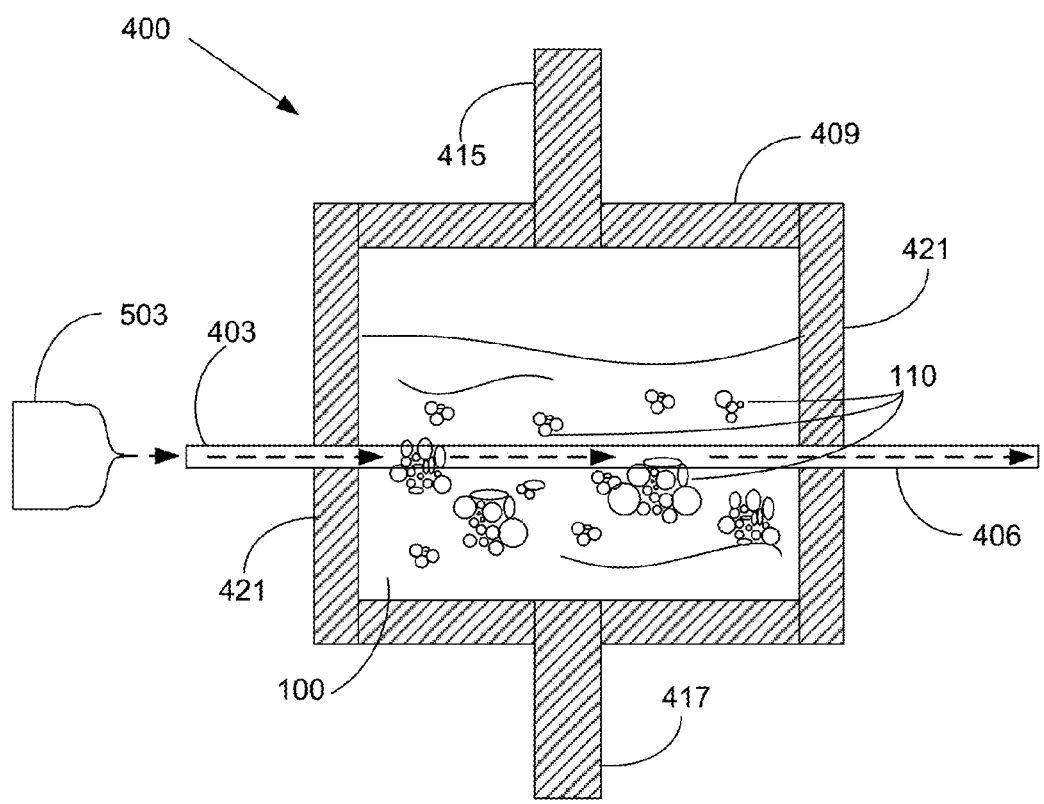
FIG. 4 illustrates a cross-section of an embodiment of the colloidal suspension laser filter of FIG. 3.

With reference to FIG. 4, shown is a cross-section of an embodiment of the colloidal suspension laser filter 400 of FIG. 3. The colloidal suspension laser filter 400 may comprise a laser beam generator 503, the laser beam input 403, the laser beam output 406, the transmissive housing 409, the inlet 415, the outlet 417, windows 421, and/or other components. The plurality of amorphous silicon particles in the colloidal suspension may be at least partially enclosed within the transmissive housing 409.

The laser beam generator 503 may be configured to generate the laser beam input 403. The laser beam input 403 may then pass through a first window 421 of the transmissive housing 409 into the colloidal suspension. The laser beam input may comprise one or more wavelengths that may be attenuated by the plurality of amorphous silicon particles within the colloidal suspension. As may be seen in FIG. 4, the plurality of amorphous silicon particles may be formed and disposed as nanoclusters throughout the colloidal suspension. The plurality of amorphous silicon particles may absorb the heat and/or energy emitting from the laser beam input 403, and the transmissive housing 409 may be configured to dissipate the heat and/or energy absorbed by the plurality of amorphous silicon particles in the colloidal suspension. Once the laser beam input 403 has been attenuated, the laser beam output 406 exits the transmissive housing 409 through a second window 421. The first window 421 and the second window 421 of the transmissive housing 409 may be constructed of boro-silicate material or any material suitable to facilitate the transmission of the laser beam input 403 and laser beam output 406.

As described above with reference to FIG. 3, the operator of the colloidal suspension laser filter 400 may manually circulate the colloidal suspension using the inlet 415 and the outlet 417 to further assist in dissipating the heat and/or energy absorbed. Alternatively, the colloidal suspension laser filter 400 may be pre-configured to automatically circulate the colloidal suspension to dissipate the heat and/or energy absorbed once a temperature within the transmissive housing 409 reaches a pre-determined maximum level.

Also, as described above, the user of the colloidal suspension laser filter 400 may adjust the absorption of the plurality of amorphous silicon particles in the colloidal suspension by adding a second solution with an oxidizing agent into the colloidal suspension through the inlet 415. In one embodiment, the second solution may be a second plurality of amorphous silicon particles formed as nanoclusters. In another embodiment, the second solution may be any oxidizing agent that oxidizes the colloidal suspension within the transmissive housing 409.

Ratios, concentrations, amounts, and other numerical data herein may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to 'y'" includes "about 'x' to about 'y'".

It should also be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

We claim at least the following:

1. A liquid filter system comprising:
a housing wherein the housing comprises an inlet and an outlet, and the housing permits a passage of a laser beam generated by a laser generator; and
a colloidal suspension solution including a first plurality of silicon nanoclusters, wherein the colloidal suspension solution is disposed within the housing, wherein the first plurality of silicon nanoclusters in the colloidal suspension solution have a first oxygen level, and wherein the first plurality of silicon nanoclusters in the colloidal suspension solution are configured to filter the laser beam absorbing energy from the laser beam at a first wavelength and transmitting energy at a second wavelength;
wherein the colloidal suspension solution further includes a second plurality of amorphous silicon nanoclusters having a second level of oxygen that is different than the first level of oxygen, wherein the second plurality of amorphous silicon nanoclusters is added to the colloidal suspension solution to adjust the total oxygen level and therefore the absorption spectrum of the colloidal suspension solution,
and wherein the housing is configured to circulate the colloidal suspension solution within or through the housing to dissipate heat released from the laser beam.

2. The liquid filter system of claim 1, wherein the second plurality of amorphous silicon nanoclusters absorb more energy from the laser beam than the first plurality of amorphous silicon nanoclusters.

3. The liquid filter system of claim 1, wherein the second level of oxygen in the second plurality of amorphous nanoclusters shifts emission of the colloidal suspension solution toward the green or blue spectra.

4. A method for controlling a wavelength of a laser beam comprising:
providing a laser generator configured to output a laser beam;
providing a transmissive housing comprising a first plurality of amorphous silicon nanoclusters in a colloidal suspension solution, the first plurality of amorphous silicon nanoclusters having a first level of oxygen, the first plurality of amorphous silicon nanoclusters configured to filter the laser beam to absorb energy of the laser beam at a first wavelength and transmit energy of the laser beam at a second wavelength;
providing a second plurality of amorphous silicon nanoclusters into the colloidal suspension solution to adjust the total oxygen level of the colloidal suspension solution and therefore the absorption spectrum of the colloidal suspension solution, the second plurality of amorphous silicon nanoclusters having a second level of oxygen, wherein the first level of oxygen and the second level of oxygen are different; and
circulating the first plurality of amorphous silicon nanoclusters and the second plurality of amorphous silicon nanoclusters through the transmissive housing to dissipate heat.

5. The method of claim 4, wherein the second plurality of amorphous silicon nanoclusters absorb more energy from the laser beam than the first plurality of amorphous silicon nanoclusters.

6. The method of claim 4, wherein the second level of oxygen in the second plurality of amorphous nanoclusters shifts the emission of the colloidal suspension solution toward the green or blue spectra.

7. A tunable laser system comprising:
a laser generator configured to output a laser beam;
a transmissive housing for the laser beam;
a first plurality of amorphous silicon nanoclusters in a colloidal suspension solution contained within the transmissive housing, wherein the first plurality of amorphous silicon nanoclusters have a first level of oxygen, wherein the first plurality of amorphous silicon nanoclusters in the colloidal suspension solution are configured to filter the laser beam, and wherein the transmissive housing dissipates heat,
wherein the first plurality of amorphous silicon nanoclusters in the colloidal suspension solution absorbs energy from the laser beam at a first wavelength and facilitates the transmission of energy at a second wavelength, and
a second plurality of amorphous silicon nanoclusters having a second level of oxygen that is different than the first level of oxygen, wherein the second plurality of amorphous silicon nanoclusters is added to the colloidal suspension solution to adjust the total oxygen level and therefore the absorption spectrum of the colloidal suspension solution.

* * * * *